US011395245B1

(12) United States Patent
Malhotra et al.

(10) Patent No.: US 11,395,245 B1
(45) Date of Patent: Jul. 19, 2022

(54) SYNCHRONIZED DATA COMMUNICATIONS OVER MULTIPLE WIRELESS LINKS AND ACCESS NODES

(71) Applicant: T-MOBILE INNOVATIONS LLC, Overland Park, KS (US)

(72) Inventors: Rajil Malhotra, Olathe, KS (US); Anubhav Visen, Overland Park, KS (US)

(73) Assignee: Sprint Communications Company LP, Overland Park, KS (US)

( * ) Notice: Subject to any disclaimer, the term of this patent is extended or adjusted under 35 U.S.C. 154(b) by 49 days.

(21) Appl. No.: 16/874,426

(22) Filed: May 14, 2020

(51) Int. Cl.
*H04W 56/00* (2009.01)
*H04W 80/08* (2009.01)
*H04W 76/27* (2018.01)
*H04W 80/02* (2009.01)
*H04W 76/15* (2018.01)

(52) U.S. Cl.
CPC ......... *H04W 56/001* (2013.01); *H04W 76/15* (2018.02); *H04W 76/27* (2018.02); *H04W 80/02* (2013.01); *H04W 80/08* (2013.01)

(58) Field of Classification Search
CPC ... H04W 56/001; H04W 76/15; H04W 76/27; H04W 80/02; H04W 80/08
USPC ........................................................ 370/329
See application file for complete search history.

(56) References Cited

U.S. PATENT DOCUMENTS

| 10,355,760 | B2 | 7/2019 | Yoo et al. | |
|---|---|---|---|---|
| 2006/0223524 | A1* | 10/2006 | Ginzburg | H04W 76/23 455/424 |
| 2010/0317284 | A1* | 12/2010 | Charbit | H04B 7/2681 455/7 |
| 2016/0006837 | A1* | 1/2016 | Reynolds | H04L 41/0853 709/203 |
| 2018/0183724 | A1* | 6/2018 | Callard | H04L 41/08 |
| 2019/0037435 | A1* | 1/2019 | Li | H04W 88/04 |
| 2019/0069205 | A1 | 2/2019 | Lee et al. | |
| 2019/0069325 | A1 | 2/2019 | Yerramalli et al. | |
| 2020/0037204 | A1 | 1/2020 | Gurumoorthy et al. | |
| 2020/0045762 | A1* | 2/2020 | Raghuram | H04W 76/30 |
| 2020/0077458 | A1 | 3/2020 | Stauffer et al. | |

(Continued)

FOREIGN PATENT DOCUMENTS

| KR | 20180108493 A | 10/2018 |
|---|---|---|
| KR | 20190098569 A | 8/2019 |
| WO | 2017204539 A1 | 11/2017 |

(Continued)

*Primary Examiner* — Sai Ming Chan

(57) ABSTRACT

In a wireless access node, a Protocol Data Convergence Protocol (PDCP) separates data into direct data and indirect data. The wireless access node wirelessly transfers the direct data to User Equipment (UE) and transfers the indirect data to a wireless support node. The wireless support node wirelessly transfers the indirect data to the UE. The PDCP estimates a transmission time difference between the direct data and the indirect data. The PDCP separates additional data into direct data and indirect data. The PDCP delays the additional direct and/or indirect data based on the time difference to synchronize delivery. The wireless access node wirelessly transfers the direct data to the UE and transfers the indirect data to the wireless support node. The wireless support node wirelessly transfers the indirect data to the UE.

14 Claims, 8 Drawing Sheets

(56) References Cited

U.S. PATENT DOCUMENTS

2020/0154320 A1\* 5/2020 Xu .................. H04W 28/02
2021/0258815 A1\* 8/2021 Marupaduga ......... H04W 76/20

FOREIGN PATENT DOCUMENTS

WO   2018174654 A1   9/2018
WO   2020033210 A1   2/2020

\* cited by examiner

SYNCHRONIZED DATA COMMUNICATIONS OVER MULTIPLE WIRELESS LINKS AND ACCESS NODES

TECHNICAL BACKGROUND

Wireless communication networks provide wireless data services to wireless user devices. Exemplary wireless data services include machine-control, Internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN). In some examples, both LTE and 5GNR networks serve the same wireless user device at the same time with an integrated data service called dual-connectivity.

The wireless communication networks receive user data from external systems for delivery to the wireless user devices. The wireless communication networks transfer the user data to the wireless access nodes. For dual-connectivity, Packet Data Convergence Protocols (PDCPs) in the wireless access nodes separate the user data into a direct data portion and an indirect data portion. The wireless access nodes wirelessly transfer the direct data portion to the wireless user devices. The wireless access nodes transfer the indirect data portion to wireless support nodes. The wireless support nodes wirelessly transfer the indirect data portion to the wireless user devices. Unfortunately, the delivery of the indirect data portion usually takes longer than the delivery of the direct data portion. The wireless user devices receive their direct and indirect data portions in an unsynchronized manner due to the time difference between the direct delivery and the indirect delivery. The wireless user devices may have to re-sequence or request a re-transmission of their unsynchronized user data.

TECHNICAL OVERVIEW

In a wireless access node, a Protocol Data Convergence Protocol (PDCP) separates user data into direct data and indirect data. The wireless access node wirelessly transfers the direct data to User Equipment (UE) and transfers the indirect data to a wireless support node. The wireless support node wirelessly transfers the indirect data to the UE. The PDCP estimates a transmission time difference between the direct data and the indirect data. The PDCP separates additional user data into direct data and indirect data. The PDCP delays the additional direct and/or indirect data based on the time difference to synchronize delivery to the UE. The wireless access node wirelessly transfers the direct data to the UE and transfers the indirect data to the wireless support node. The wireless support node wirelessly transfers the indirect data to the UE.

DETAILED DESCRIPTION

Figure 1:
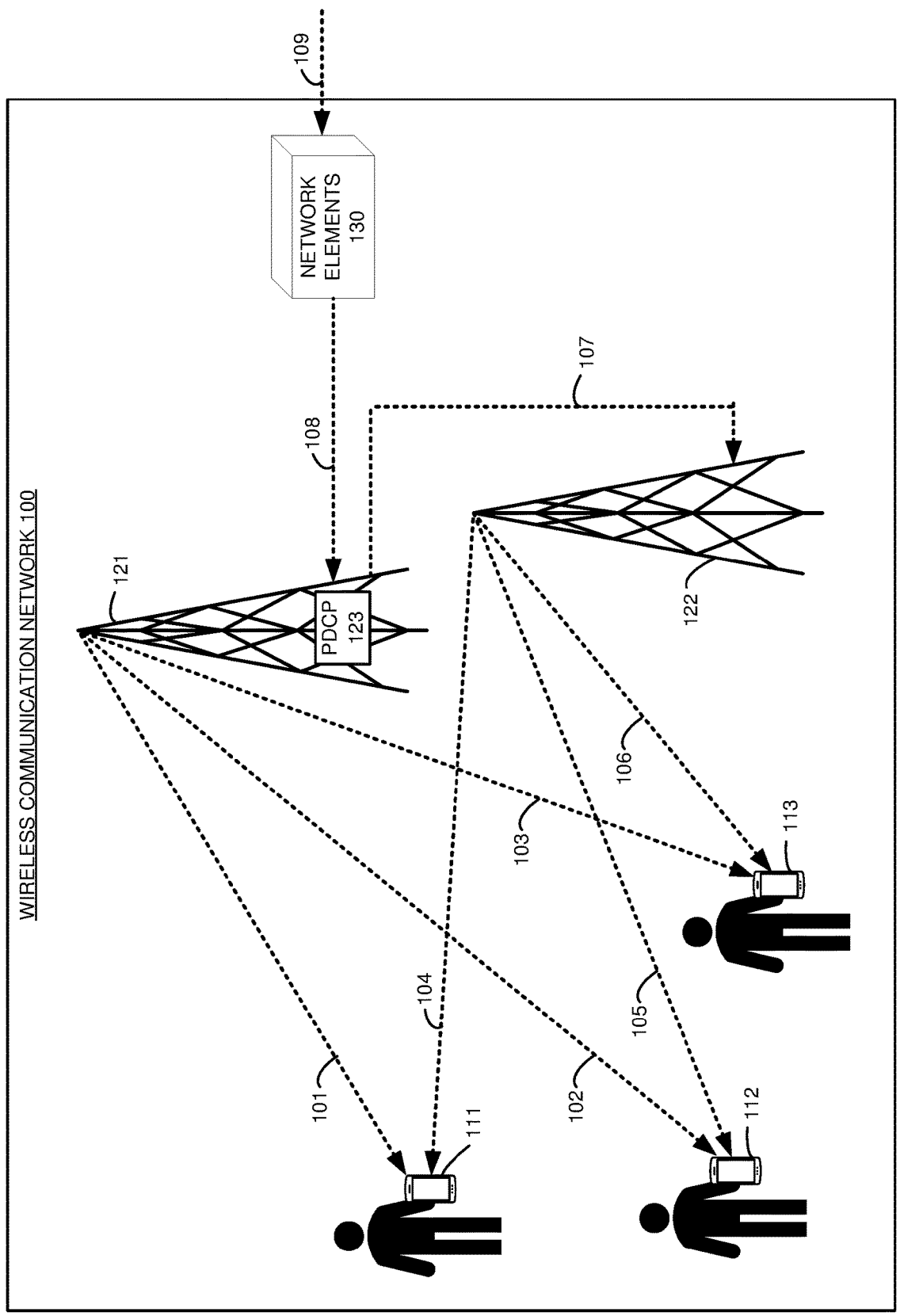
FIG. 1 illustrates a wireless communication network to serve wireless User Equipment (UEs) with a synchronized data service over multiple wireless links and access nodes.

FIG. 1 illustrates wireless communication network 100 to serve wireless User Equipment (UEs) 111-113 with a synchronized data service over wireless links 101-106 and wireless nodes 121-122. Wireless communication network 100 comprises wireless UEs 111-113, wireless access node 121, wireless support node 122, and network elements 130. Although UEs 111-113 are depicted as smartphones operated by humans, UEs 111-113 might instead comprise wearable computers, robots, vehicles, or some other data appliances with wireless communication circuitry that may or may not be operated by humans. Wireless nodes 121-122 are depicted as radio towers, but nodes 121-122 may use other mounting structures or no mounting structure at all. Wireless access node 121 executes Protocol Data Convergence Protocol (PDCP) 123.

Various examples of network operation and configuration are described herein. In one example, network elements 130 receive user data over external link 109 and transfer the user data to wireless access node 121 over network link 108 for delivery to wireless UEs 111-113. Wireless access node 121 receives the user data over network link 108. Wireless access node 121 transfers the user data to PDCP 123. PDCP 123 separates the user data into a direct portion and an indirect portion. The direct portion will be transferred directly to wireless UEs 111-113 from wireless access node 121, and the indirect portion will be transferred indirectly to wireless UEs 111-113 over wireless support node 122. PDCP 123 routes the direct portion toward wireless UEs 111-113 and routes the indirect portion toward wireless support node 122. Wireless access node 121 receives the routed user data from PDCP 123. Wireless access node 121 wirelessly transfers the direct portion to wireless UEs 111-113 over wireless links 101-103. Wireless access node 121 transfers the indirect portion to wireless support node 122 over network links 107. Wireless support node 122 receives the indirect data over network links 107 and wirelessly transfers the indirect data to wireless UEs 111-113 over wireless links 104-106.

In wireless access node 121, PDCP 123 estimates a transmission time difference between the delivery of the direct data and the delivery of the indirect data. The transmission time may comprise the elapsed time from data arrival over external link 109 to data transfer over wireless links 101-106. The transmission time may comprise the elapsed time from data arrival over network link 108 to data transfer over wireless links 101-106. PDCP 123 may estimate the transmission time difference based on metrics like data throughput and buffer fill. For example, PDCP 123 may multiply the data throughput for wireless access node 121 by the buffer fill for wireless access node 121 to estimate a time amount for direct delivery. Likewise, PDCP 123 may multiply the data throughput for wireless support node 122 by the buffer fill for wireless support node 122 to estimate another time amount for indirect delivery. PDCP 123 could estimate the transmission time difference by based on the difference between these two time amounts.

Network elements 130 receive additional user data over external links 109 and transfer the additional data to wireless access node 121 over network links 108 for delivery to wireless UEs 111-113. Wireless access node 121 receives the additional data over network links 108 and transfers the additional data to PDCP 123. PDCP 123 separates the additional data into a direct portion and an indirect portion. PDCP 123 delays the direct portion and/or the indirect portion based on the estimated transmission time difference to synchronize delivery of the additional user data to UEs 111-113 over wireless nodes 121-122. Typically, the direct transmission time is shorter, so the direct portion is delayed by the estimated transmission time difference. PDCP 123 routes the indirect portion toward wireless support node 122, and wireless access node 121 transfers the indirect portion to wireless support node over network links 107. PDCP 123 routes the direct portion toward wireless UEs 111-113, and wireless access node 121 wirelessly transfers the direct portion to wireless UEs 111-113 over wireless links 101-103. Wireless support node 122 receives the indirect portion over network links 107 and wirelessly transfers the indirect portion to wireless UEs 111-113 over wireless links 104-106.

Wireless UE 111 initially receives user data in an unsynchronized manner over wireless links 101 and 104 due to the significant transmission time difference between the direct delivery and the indirect delivery. When PDCP 123 estimates the time difference and applies the corresponding time delay, wireless UE 111 subsequently receives user data in a synchronized manner over wireless links 101 and 104 due to the equalized transmission time difference between the direct and the indirect delivery. Wireless UE 112 initially receives user data in an unsynchronized manner over wireless links 102 and 105, but when PDCP 123 estimates the time difference and applies the corresponding time delay, wireless UE 112 receives user data in a synchronized manner over wireless links 102 and 105. Likewise, wireless UE 113 initially receives user data in an unsynchronized manner over wireless links 103 and 106, but when PDCP 123 estimates the time difference and applies the corresponding time delay, wireless UE 113 receives user data in a synchronized manner over wireless links 103 and 106.

Wireless nodes 121-122 comprise Fifth Generation New Radio (5GNR) gNodeBs, Long Term Evolution (LTE) eNodeBs, Institute of Electrical and Electronic Engineers (IEEE) 802.11 (WIFI) hotspots, Low-Power Wide Area Network (LP-WAN) access points, and/or some other wireless network apparatus. In some examples, wireless access node 121 comprises a 5GNR gNodeB and wireless support node 122 comprises an LTE eNodeB. Together, this 5GNR gNodeB and this LTE eNodeB may comprise an Evolved Universal Terrestrial Radio Access Network Dual Connectivity (EN-DC) access node. Network elements 130 may comprise Mobility Management Entities (MMEs), Serving Gateways (SGWs), Packet Data Network Gateways (PGWs), Home Subscriber Systems (HSS), Policy Charging Rules Functions (PCRFs), and/or some other network controllers, databases, and gateways—including Fifth Generation Core (5GC) network functions.

Wireless communication network 100 may comprise a Central Unit (CU) and Distributed Unit (DU). The CU might comprise the portion of wireless access node 121 that includes a 5GNR version of PDCP 123. The CU also comprises the portion of wireless support node 122 that includes an LTE Radio Resource Control (RRC), LTE PDCP, LTE Radio Link Control (RLC), LTE Media Access Control (MAC), and LTE Physical Layer (PHY). The DU comprises the portion of wireless access node 121 that includes a 5GNR RLC, 5GNR MAC, and 5GNR PHY.

Wireless links 101-106 use over-the-air air electromagnetic frequencies in the low-band, mid-band, high-band, or some other portion of the electromagnetic spectrum. Wireless links 101-106 use protocols like 5GNR, LTE, WIFI, LP-WAN, and/or some other wireless format. Links 107-109 use metal, glass, air, or some other media. Links 107-109 use IEEE 802.3 (Ethernet), Time Division Multiplex (TDM), Data Over Cable System Interface Specification (DOCSIS), Internet Protocol (IP), Hypertext Transfer Protocol (HTTP), 5GC, 5GNR, LTE, WIFI, virtual switching, inter-processor communication, bus interfaces, and/or some other data communication protocols. Links 107-109 may comprise intermediate network elements like relays, routers, and controllers.

UEs 111-113 and wireless nodes 121-122 comprise antennas, amplifiers, filters, modulation, analog/digital interfaces, microprocessors, software, memories, transceivers, bus circuitry, and the like. Network elements 130 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein.

Figure 2:
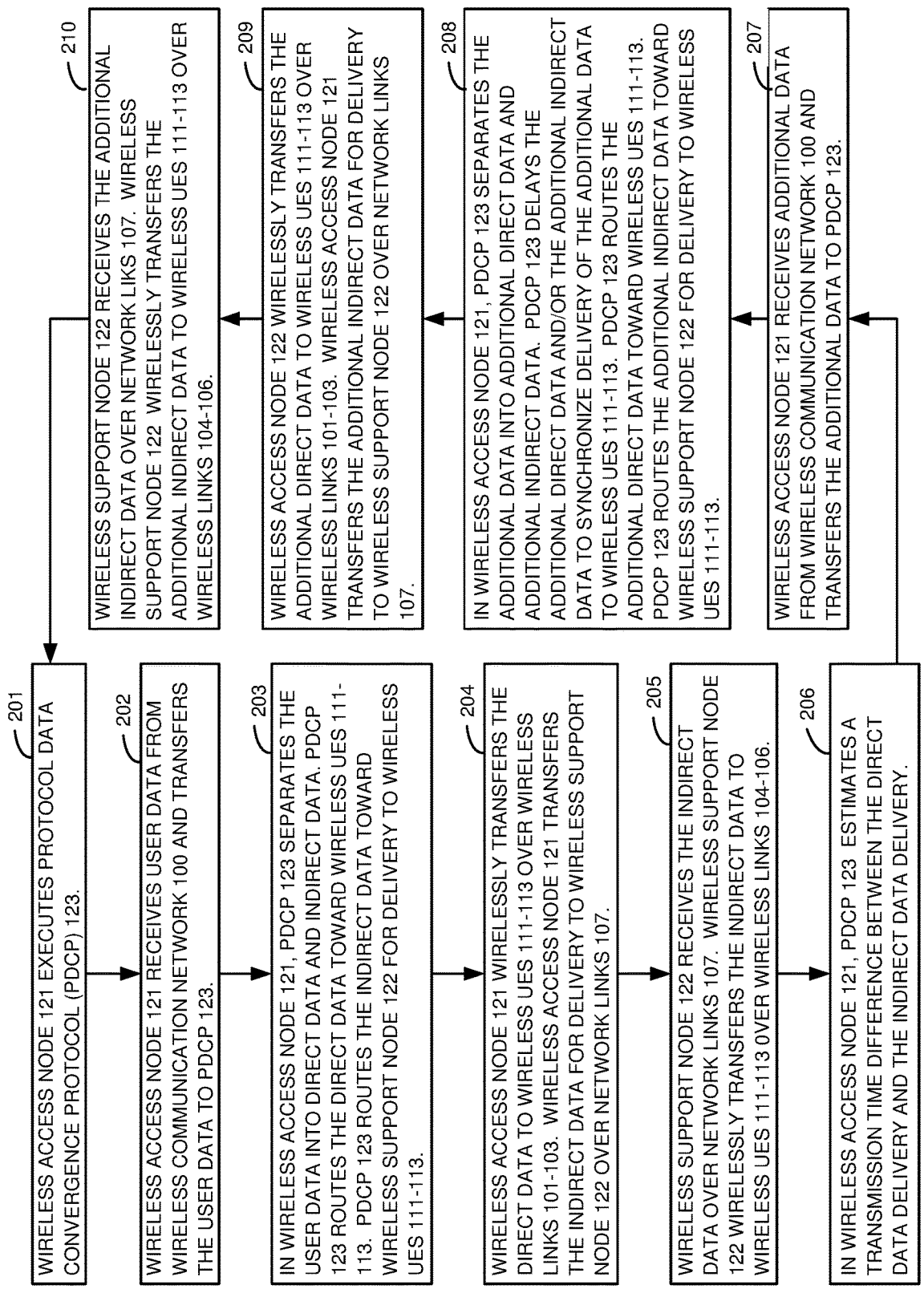
FIG. 2 illustrates an exemplary operation of the wireless communication network to serve the wireless UEs with the synchronized data service over the multiple wireless links and access nodes.

FIG. 2 illustrates another exemplary operation of wireless communication network 100 to serve wireless UEs 111-113 with the synchronized data service over wireless links 101-106 and nodes 121-122. Wireless access node 121 executes a PDCP (201). Wireless access node 121 receives user data from wireless communication network 100 and transfers the user data to PDCP 123 (202). In wireless access node 121, PDCP 123 separates the user data into direct data and indirect data (203). PDCP 123 routes the direct data toward wireless UEs 111-113 and routes the indirect data toward wireless support node 122 (203). Wireless access node 121 wirelessly transfers the direct data to wireless UEs 111-113 over wireless links 101-103 (204). Wireless access node 121 transfers the indirect data to wireless support node 122 over network links 107 (204). Wireless support node 122 receives the indirect data over network links 107 (205). Wireless support node 122 wirelessly transfers the indirect data to wireless UEs 111-113 over wireless links 104-106 (205). Wireless UEs 111-113 usually receive their user data from wireless nodes 121-122 in an unsynchronized manner due to the significant transmission time difference between the direct delivery and the indirect delivery.

In wireless access node 121, PDCP 123 estimates a transmission time difference between the delivery of the direct data and the indirect data (206). PDCP 123 may estimate the transmission time difference by: 1) multiplying direct throughput by direct buffer fill to estimate direct delivery time, 2) multiplying indirect throughput by indirect buffer fill to estimate indirect delivery time, and 3) and subtracting the shorter delivery time from the longer delivery time. Wireless access node 121 receives additional data from wireless communication network 100 and transfers the additional data to PDCP 123 (207). In wireless access node 121, PDCP 123 separates the additional data into additional direct data and additional indirect data (208). PDCP 123 delays the direct data and/or the indirect data based on the transmission time difference to synchronize delivery of the additional data (208). Typically, the direct transmission time is shorter and is delayed by the estimated transmission time difference. PDCP 123 routes the direct data toward wireless UEs 111-113. PDCP 123 routes the indirect data toward wireless support node 122 for delivery to wireless UEs 111-113 (208). Wireless access node 121 wirelessly transfers the direct data to wireless UEs 111-113 over wireless links 101-103 (209). Wireless access node 121 transfers the indirect data to wireless support node 122 over network links 107 (209). Wireless support node 122 receives the indirect data over network links 107 (210). Wireless support node 122 wirelessly transfers the indirect data to wireless UEs 111-113 over wireless links 104-106 (210). Wireless UEs 111-113 now receive their user data from wireless nodes 121-122 in a synchronized manner due to the insignificant transmission time difference between the direct delivery and the indirect delivery.

Figure 3:
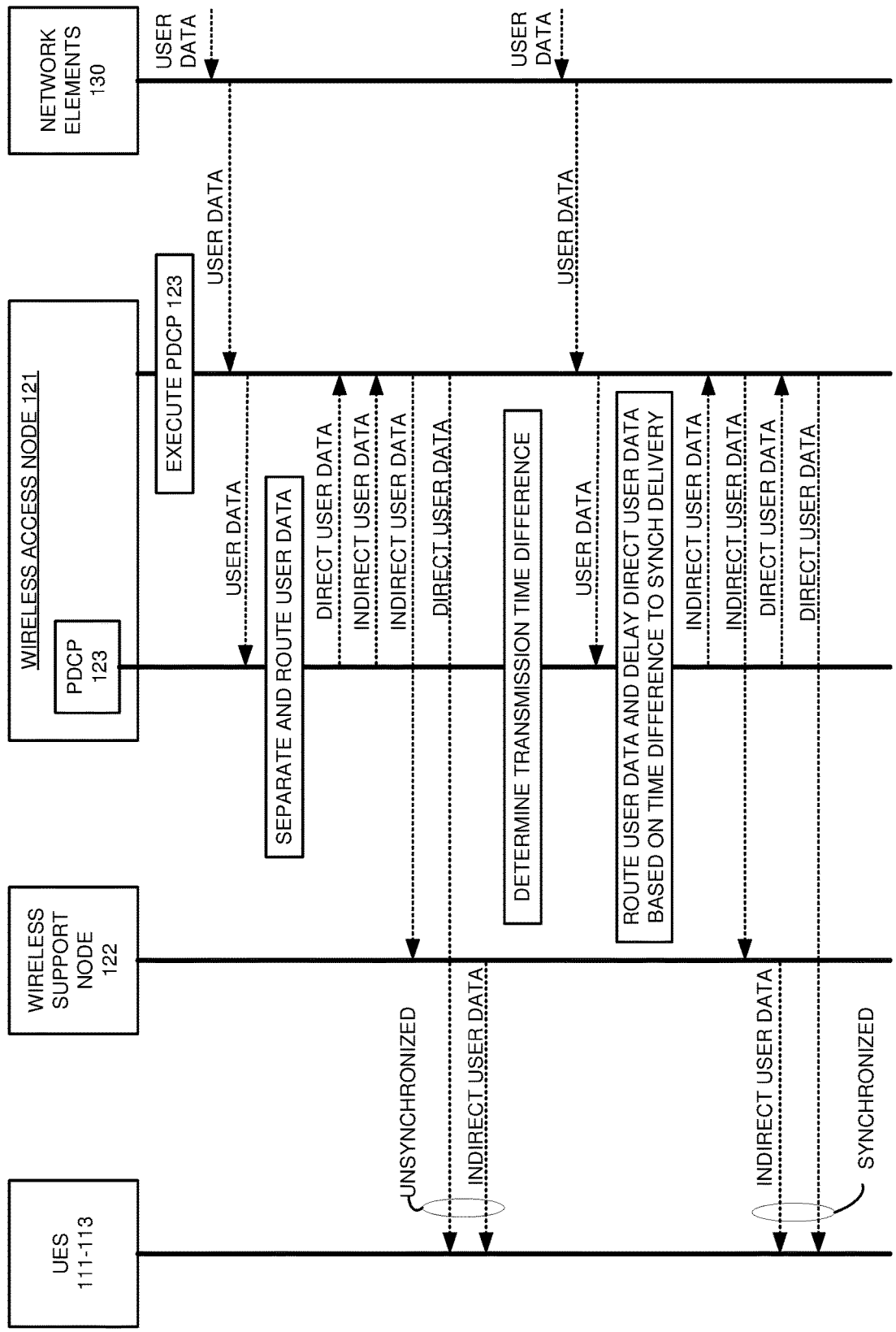
FIG. 3 illustrates an exemplary operation of the wireless communication network to serve the wireless UEs with the synchronized data service over the multiple wireless links and access nodes.

FIG. 3 illustrates another exemplary operation of wireless communication network 100 to serve wireless UEs 111-113 with the synchronized data service over wireless links 101-106 and wireless nodes 121-122. Wireless access node 121 executes PDCP 123. Network elements 130 receive user data and transfer the user data to wireless access node 121 for delivery to wireless UEs 111-113. Wireless access node 121 transfers the user data to PDCP 123. PDCP 123 separates the user data into direct data and indirect data. PDCP 123 routes the direct data toward wireless UEs 111-113 and routes the indirect data toward wireless support node 122. Wireless access node 121 receives the routed data from PDCP 123. Wireless access node 121 transfers the indirect data to wireless support node 122. Wireless access node 121 wirelessly transfers the direct data to wireless UEs 111-113. Wireless support node 122 wirelessly transfers the indirect data to wireless UEs 111-113. Wireless UEs 111-113 usually receive their user data from wireless nodes 121-122 in an unsynchronized manner due to the significant transmission time difference between direct and indirect delivery.

PDCP 123 estimates the transmission time difference between the delivery of the direct data and the indirect data—typically based on data throughput and buffer fill for the direct delivery versus the indirect delivery. Network elements 130 receive additional user data and transfer the additional user data to wireless access node 121 for delivery to wireless UEs 111-113. Wireless access node 121 transfers the additional user data to PDCP 123. PDCP 123 separates the additional user data into direct data and indirect data. PDCP 123 delays the direct data and/or the indirect data based on the estimated transmission time difference to synchronize delivery of the additional user data to UEs 111-113 over wireless nodes 121-122. Typically, the direct transmission time is shorter, so the direct data is delayed. PDCP 123 routes the indirect data toward wireless support node 122, and wireless access node 121 transfers the indirect data to wireless support node 122. Wireless support node 122 wirelessly transfers the indirect data to wireless UEs 111-113. PDCP 123 routes the direct data toward UEs 111-113, and wireless access node 121 wirelessly transfers the direct data to wireless UEs 111-113. Wireless UEs 111-113 receive their additional user data from wireless nodes 121-122 in a synchronized manner due to the insignificant transmission time difference between direct delivery and indirect delivery.

Figure 4:
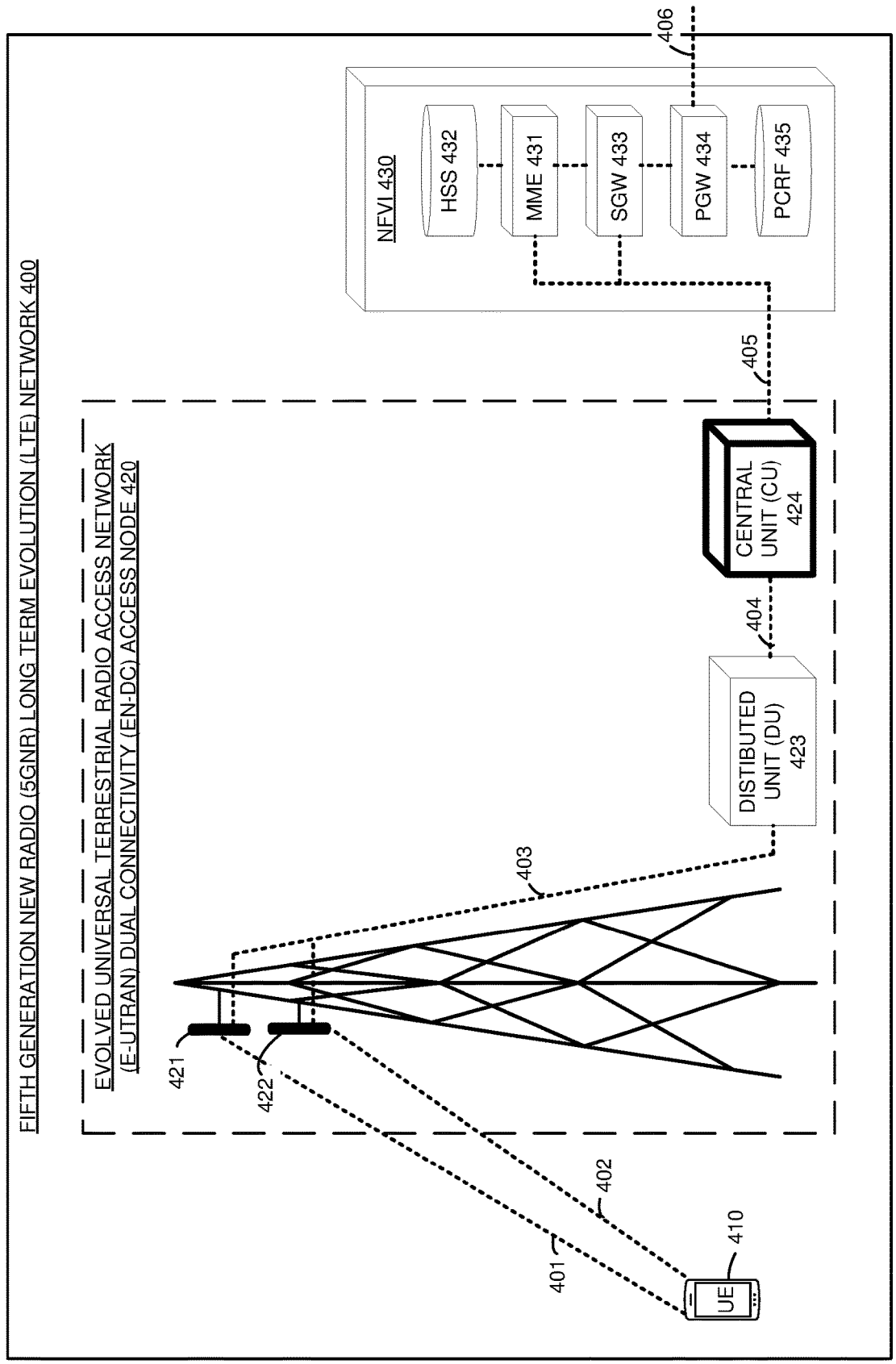
FIG. 4 illustrates a Fifth Generation New Radio (5GNR) Long Term Evolution (LTE) network to serve 5GNR/LTE UEs with the synchronized data service over 5GNR/LTE links.

FIG. 4 illustrates Fifth Generation New Radio (5GNR) Long Term Evolution (LTE) network 400 to serve 5GNR/LTE UE 410 with a synchronized data service over 5GNR/LTE links 401-402. 5GNR/LTE network 400 is an example of wireless communication network 100, although network 100 may differ. 5GNR/LTE network 400 comprises 5GNR/LTE UE 410, Evolved Universal Terrestrial Radio Access Network Dual Connectivity (EN-DC) node 420, and Network Function Virtualization Infrastructure (NFVI) 430. EN-DC node 420 comprises 5GNR radio 421, LTE radio 422, Distributed Unit (DU) 423, and Central Unit (CU) 424. NFVI 430 comprises Mobility Management Entity (MME) 431, Home Subscriber System (HSS) 432, Serving Gateway (SGW) 433, Packet Data Network Gateway (PGW) 434, and Policy Charging Rules Function (PCRF) 435.

CU 424 hosts a 5GNR PDCP, LTE Radio Resource Control (RRC), LTE PDCP, LTE Radio Link Control (RLC), LTE Media Access Control (MAC), and LTE Physical Layer (PHY). DU 423 hosts a 5GNR RLC, 5GNR MAC, and 5GNR PHY. 5GNR/LTE UE 410 and 5GNR radio 421 communicate over 5GNR link 401. 5GNR/LTE UE 410 and LTE radio 422 communicate over LTE link 402. Radios 421-422 and DU 423 communicate over Common Public Radio Interface (CPRI) links 403. DU 423 and CU 424 communicate over fronthaul links 404. CU 424 communicates with MME 431 and SGW 433 over backhaul links 405. PGW 434 communicates with external systems over SGi links 406.

In operation, 5GNR/LTE UE 410 attaches to EN-DC node 420 over LTE link 402 and LTE radio 422. 5GNR/LTE UE 410 indicates its 5GNR UE capability. EN-DC node 420 requests data service for UE 410 from MME 431 over backhaul links 405. EN-DC node 420 indicates the 5GNR UE capability. MME 431 interacts with HSS 432 to authenticate and authorize LTE/5GNR UE 410 for wireless data services that are represented by Access Point Names (APNs). MME 431 generates 5GNR instructions for UE 410 in response to the 5GNR UE capability and the UE authorization. MME 431 transfers the APNs for UE 410 to PGW 434 over SGW 433. PGW 434 interacts with PCRF 435 to select Quality-of-Service Class Identifiers (QCIs) and network addresses for LTE/5GNR UE 410 based on the APNs. PGW 434 transfers the APNs, QCIs, and network addresses for UE 410 to MME 431 over SGW 433. MME 431 transfers the APNs, QCIs, network address, and 5GNR instructions for UE 410 to EN-DC node 420. EN-DC node 420 transfers the selected APNs, QCIs, network addresses, and 5GNR instructions to UE 410 over LTE radio 422 and LTE link 402.

PGW 434 exchanges user data for UE 410 with external systems over SGi links 406. PGW 434 exchanges the user data with SGW 433 which exchanges the user data with EN-DC node 420 over backhaul links 405. EN-DC node 420 wirelessly exchanges the user data with 5GNR/LTE UE 410 over LTE radio 422 and LTE link 402.

In response to the 5GNR instructions, 5GNR/LTE UE 410 measures the signal strength of 5GNR link 401 from 5GNR radio 421 to EN-DC node 420. 5GNR/LTE UE 410 reports the signal strength of 5GNR link 401 from 5GNR radio 421 to EN-DC node 420. Since the APNs/QCIs for UE 410 warrant 5GNR transmission and the signal quality over 5GNR link 401 is adequate, EN-DC node 420 directs UE 410 to attach to EN-DC node 420 over 5GNR link 401 and 5GNR radio 421. EN-DC node 420 signals the 5GNR attachment to MME 431. MME 431 directs SGW 433 to serve UE 410 over another connection in backhaul links 405 to CU 424.

PGW 434 continues to exchange user data for UE 410 with external systems over SGi links 406. PGW 434 exchanges the user data with SGW 433 which exchanges the user data with EN-DC node 420 over backhaul links 405. EN-DC node 420 wirelessly exchanges the user data with UE 410 over 5GNR/LTE links 401-402. In particular, the 5GNR PDCP in CU 424 splits its downlink user data into a direct portion of 5GNR data and an indirect portion of LTE data. EN-DC node 420 wirelessly transfers the direct 5GNR data to 5GNR/LTE UE 410 over 5GNR link 401. EN-DC node 420 wirelessly transfers the indirect LTE data to 5GNR/LTE UE 410 over LTE link 402. UE 410 receives the user data in an unsynchronized manner over 5GNR link 401 and LTE link 402 due to the significant transmission time difference between the 5GNR delivery and the LTE delivery.

In CU 424, the 5GNR PDCP estimates a downlink transmission time difference between the 5GNR data delivery and the LTE data delivery. The 5GNR downlink time may be estimated by multiplying the downlink throughput over 5GNR link 401 by the 5GNR RLC buffer fill in DU 423. The LTE downlink time may be estimated by multiplying the downlink throughput over LTE link 402 by the LTE RLC buffer fill in CU 424. The downlink transmission time difference may then be estimated by subtracting the 5GNR transmission time from the LTE transmission time. The transmission time difference may be designated in microseconds, milliseconds, or some other increment.

PGW 434 continues to exchange user data for UE 410 with external systems over SGi links 406. PGW 434 exchanges the user data with SGW 433 which exchanges the user data with EN-DC node 420 over backhaul links 405. EN-DC node 420 wirelessly exchanges the user data with UE 110 over 5GNR/LTE links 401-402. In particular, the 5GNR PDCP in CU 424 splits the downlink user data into direct 5GNR data and indirect LTE data. The 5GNR PDCP delays the direct 5GNR data and/or the indirect LTE data based on the transmission time difference to synchronize data delivery to 5GNR/LTE UE 410 over 5GNR link 401 and LTE link 402. Typically, the 5GNR transmission time is shorter, so the direct 5GNR data is delayed by the estimated transmission time difference. UE 410 now receives the user data in a synchronized manner over 5GNR link 401 and LTE link 402 due to the equalized transmission times for the 5GNR delivery and the LTE delivery.

Figure 5:
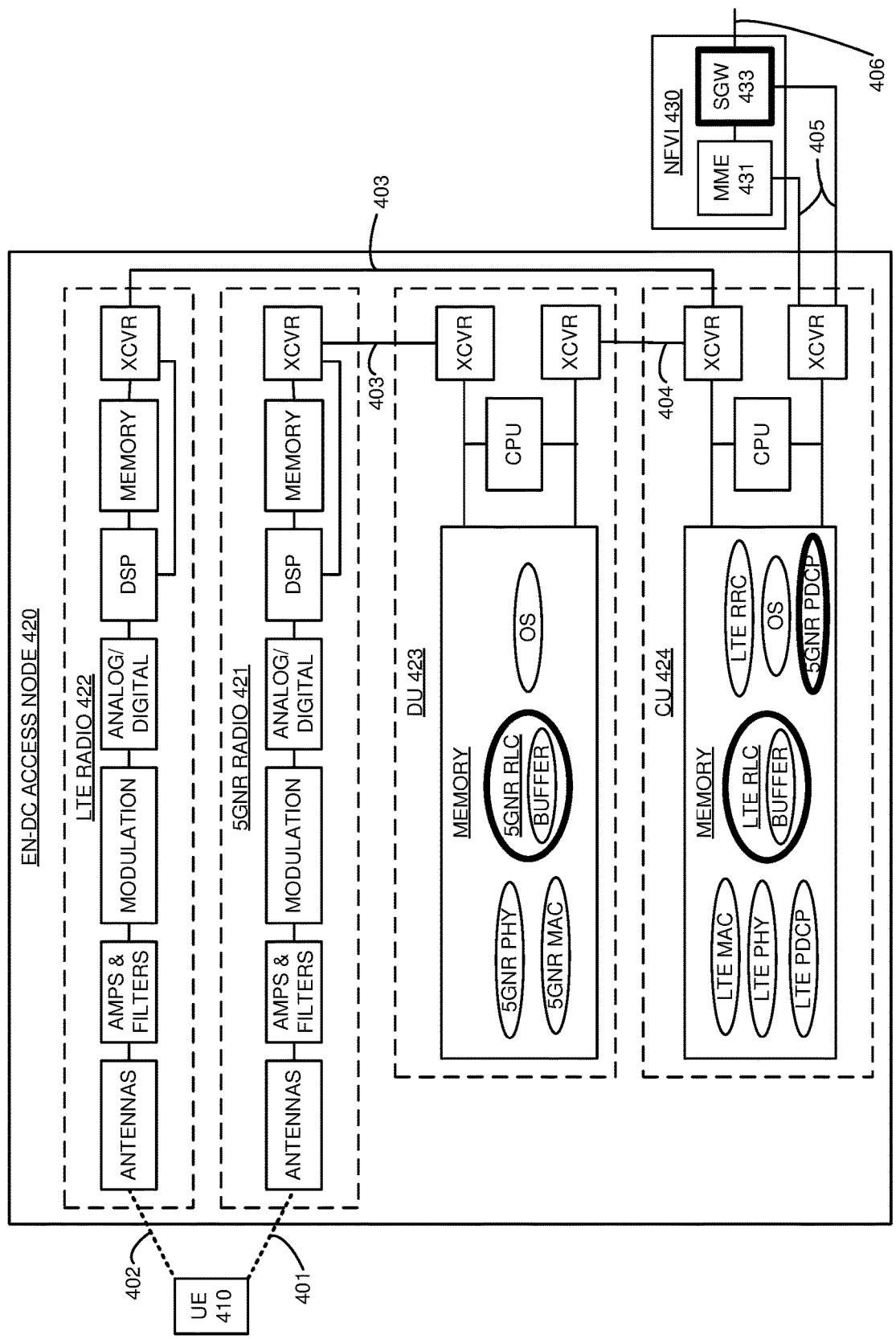
FIG. 5 illustrates an Evolved Universal Terrestrial Radio Access Network Dual Connectivity (EN-DC) access node to serve the 5GNR/LTE UEs with the synchronized data service over the 5GNR/LTE links and the EN-DC access node.

FIG. 5 illustrates Evolved Universal Terrestrial Radio Access Network Dual Connectivity (EN-DC) access node 420 to serve 5GNR/LTE UE 410 with the synchronized data service over the 5GNR/LTE links 401-402. EN-DC access node 420 is an example of wireless nodes 121-122, although nodes 121-122 may differ. EN-DC access node 420 comprises 5GNR radio 421, LTE radio 422, DU 423, and CU 424. Radios 421-422 comprise antennas, amplifiers, filters, modulation, analog-to-digital interfaces, DSP, memory, and transceivers (XCVR) that are coupled over bus circuitry. DU 423 and CU 424 comprise memory, CPU, and transceivers that are coupled over bus circuitry. The memory in CU 424 stores an operating system (OS), 5GNR PDCP, LTE PHY, LTE MAC, LTE RLC, LTE PDCP, and LTE RRC. The memory in DU 423 stores an operating system, 5GNR PHY, 5GNR MAC, and 5GNR RLC. The 5GNR RLC in DU 423 and the LTE RLC in CU 424 have RLC buffers for downlink user data. The CPUs in DU 423 and CU 424 execute the operating systems, PHYs, MACs, RLCs, PDCPs, and RRCs to exchange network signaling with UE 410 and MME 431 and to exchange user data between UE 410 and SGW 433.

Note that a 5GNR gNodeB is comprised of 5GNR radio 421, DU 423, and the portion of CU 424 used by the 5GNR PDCP. An LTE eNodeB is comprised of LTE radio 422 and the portion of CU 424 used by the LTE RRC, PDCP, RLC, MAC, and PHY. For clarity, the 5GNR gNodeB and LTE eNodeB designations are omitted from FIG. 5.

5GNR/LTE UE 410 is wirelessly coupled to the antennas in 5GNR radio 421 over 5GNR link 401. 5GNR/LTE UE 410 is wirelessly coupled to the antennas in LTE radio 422 over LTE link 402. A transceiver in 5GNR radio 421 is coupled to a transceiver in DU 423 over CPRI links 403. A transceiver in LTE radio 422 is coupled to a transceiver in CU 424 over CPRI links 403. Transceivers in DU 423 and CU 424 are coupled together over fronthaul links 404. At least one transceiver in CU 424 is coupled to MME 431 and SGW 433 over backhaul links 405. In CU 424, the LTE RRC and the 5GNR PDCP are coupled over virtualized X2 links.

In LTE radio 422, the antennas receive wireless LTE signals from 5GNR/LTE UE 410 that transport Uplink (UL) LTE signaling and UL LTE data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and the UL LTE data. The LTE RRC processes the UL LTE signaling and Downlink (DL) S1-MME signaling to generate new UL S1-MME signaling and new DL LTE signaling. The LTE RRC transfers the new UL S1-MME signaling to MME 431 over the backhaul links. The LTE PDCP transfers the UL LTE data to LTE SGW 433 over backhaul links 405.

In CU 424, the LTE RRC receives the DL S1-MME signaling from MME 431, and the LTE PDCP receives DL LTE data from SGW 433. The LTE RRC, PDCP, RLC, MAC and PHY process the new DL LTE signaling and the DL LTE data to generate corresponding DL LTE symbols that carry the DL LTE signaling and DL LTE data. In LTE radio 422, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL LTE signaling and DL LTE data to UE 410.

In 5GNR radio 501, the antennas receive wireless 5GNR signals from 5GNR/LTE UE 410 that transport Uplink (UL) 5GNR signaling and UL 5GNR data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5GNR PDCP processes the UL 5GNR signaling and DL X2 signaling from the LTE RRC to generate new UL X2 signaling and new DL 5GNR signaling. The 5GNR PDCP transfers the new UL X2 signaling to the LTE RRC in CU 424. The 5GNR PDCP transfers the UL 5GNR data to SGW 433 over backhaul links 405.

In CU 424, the 5GNR PDCP receives the DL X2 signaling from the LTE RRC. The 5GNR PDCP also receives DL 5GNR data from SGW 433. The 5GNR PDCP, RLC, MAC, and PHY process the new DL 5GNR signaling and the DL 5GNR data to generate corresponding DL 5GNR symbols that carry the DL 5GNR signaling and DL 5GNR data. In 5GNR radio 421, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5GNR signaling and DL 5GNR data to UE 410.

RRC functions comprise authentication, security, handover control, status reporting, Quality-of-Service (QoS), network broadcasts and pages, and network selection. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

In operation, 5GNR/LTE UE 410 attaches to the LTE RRC in CU 424 over LTE radio 422 and indicates its 5GNR UE capability. The LTE RRC requests data service for UE 410 from MME 431 and indicates the 5GNR UE capability. MME 431 responds to the LTE RRC with APNs, QCIs, network addresses, and 5GNR instructions for UE 410. The LTE RRC transfers the APNs, QCIs, network addresses, and 5GNR instructions to UE 410 over the LTE RLC, LTE MAC, LTE PHY, and LTE radio 422. The LTE PDCP in CU 424 exchanges user data with SGW 433. The LTE PDCP exchanges user data with UE 410 over the LTE RLC, LTE MAC, LTE PHY, and LTE radio 422.

In response to the 5GNR instructions, 5GNR/LTE UE 410 measures and reports the signal strength of 5GNR link 401 to the LTE RRC. Since the APNs/QCIs for UE 410 warrant 5GNR transmission and the signal quality over 5GNR link 401 is adequate, the LTE RRC directs UE 410 to attach to 5GNR radio 421 over 5GNR link 401. The LTE RRC signals the 5GNR attachment to MME 431. MME 431 directs SGW 433 to serve UE 410 over another connection in backhaul links 405 to the 5GNR PDCP in CU 424.

SGW 433 exchanges user data with the 5GNR PDCP in CU 424. The 5GNR PDCP exchanges the user data with UE 410 over radios 421-422. In particular, the 5GNR PDCP in CU 424 splits the user data evenly (50/50) into direct 5GNR data and indirect LTE data. The 5GNR PDCP in CU 424 transfers the 5GNR data to 5GNR/LTE UE 410 over the 5GNR RLC, 5GNR MAC, 5GNR PHY, and 5GNR radio 421. The 5GNR PDCP in CU 424 transfers the LTE data to 5GNR/LTE UE 410 over the LTE RLC, LTE MAC, LTE PHY, and LTE radio 422.

In CU 424, the 5GNR PDCP estimates a downlink transmission time difference between the 5GNR data delivery and the LTE data delivery. The 5GNR downlink time may be estimated by multiplying the downlink throughput over 5GNR link 401 and the 5GNR RLC buffer fill in DU 423. The LTE downlink time may be estimated by multiplying the downlink throughput over LTE link 402 and the LTE RLC buffer fill in CU 424. The downlink transmission time difference may then be estimated by subtracting the 5GNR transmission time from the LTE transmission time. The transmission time difference may be designated in microseconds, milliseconds, or some other increment.

PGW 434 continues to exchange user data for UE 410 with external systems over SGi links 406. PGW 434 exchanges the user data with SGW 433 which exchanges the user data with EN-DC node 420 over backhauls links 405. EN-DC node 420 wirelessly exchanges the user data with UE 410 over CU 424, DU 423, radios 421-422, and links 401-402. In particular, the 5GNR PDCP in CU 424 splits its downlink user data into 5GNR data and LTE data. The 5GNR PDCP delays the 5GNR data and/or the LTE data on the transmission time difference to synchronize data delivery to 5GNR/LTE UE 410 over 5GNR link 401 and LTE link 402. Typically, the 5GNR transmission time is shorter, so the 5GNR data is delayed by the estimated transmission time difference. UE 410 now receives the user data in a synchronized manner over 5GNR link 401 and LTE link 402 due to the equalized transmission times for the 5GNR delivery and the LTE delivery.

Figure 6:
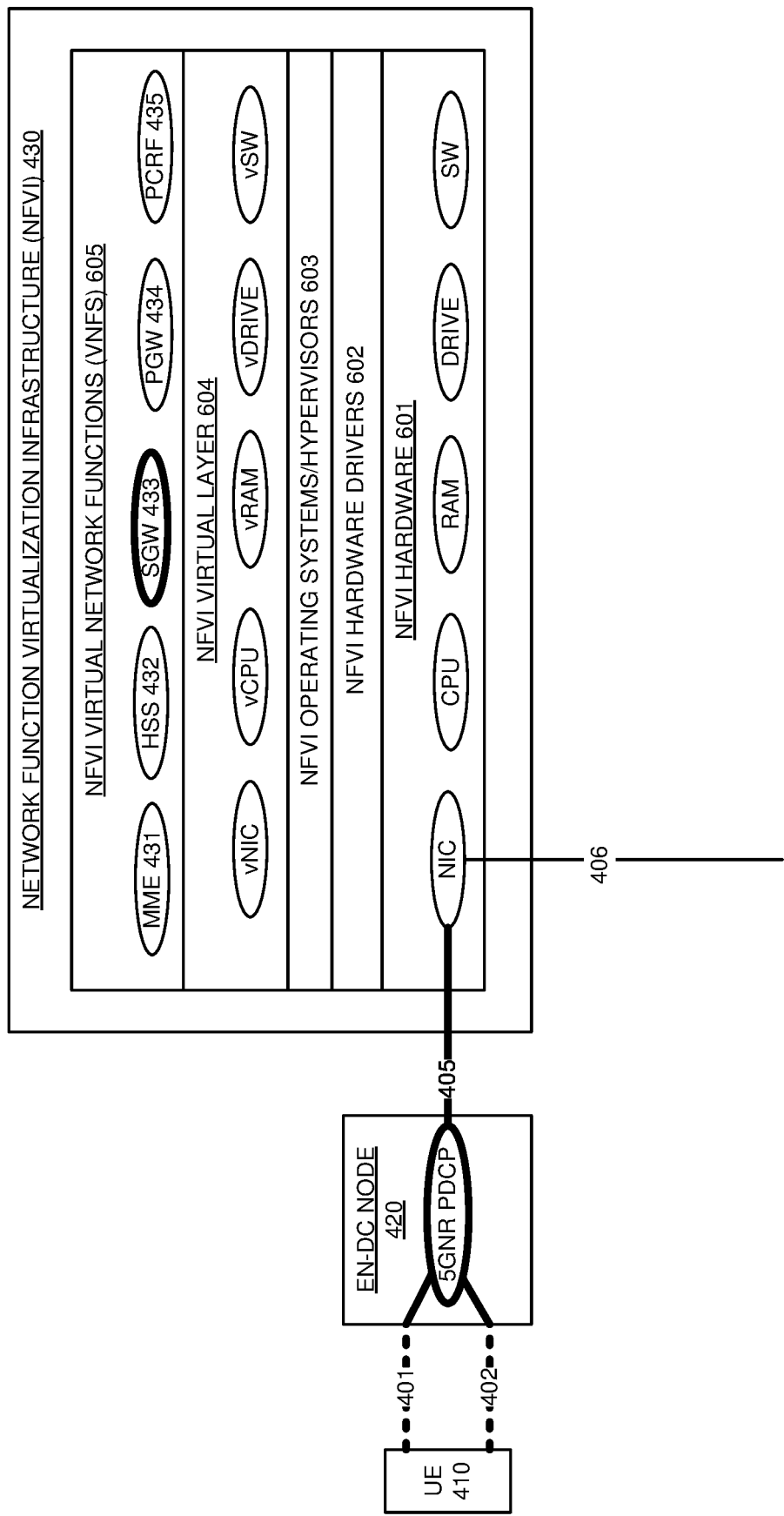
FIG. 6 illustrates a Network Function Virtualization Infrastructure (NFVI) to serve the 5GNR/LTE UEs with the data service over the 5GNR/LTE links and the EN-DC access node.

FIG. 6 illustrates Network Function Virtualization Infrastructure (NFVI) 430 to serve 5GNR/LTE UE 410 with the data service over 5GNR/LTE links 401-402 and EN-DC access node 420. NFVI 430 is an example of network elements 130, although network elements 130 may differ. NFVI 430 comprises NFVI hardware 601, NFVI hardware drivers 602, NFVI operating systems and hypervisors 603, NFVI virtual layer 604, and NFVI Virtual Network Functions (VNFs) 605. NFVI hardware 601 comprises Network Interface Cards (NIC), CPU, RAM, flash/disk drives, and data switches (SWS). NFVI virtual layer 604 comprises virtual NICs (vNIC), virtual CPUs (vCPU), virtual RAM (vRAM), virtual Drives (vDRIVE), and virtual Switches (vSW). The NIC are coupled to EN-DC node 420 over backhaul links 405. The NIC are coupled to external systems over SGi links 406. NFVI VNFs 605 comprise MME 431, HSS 432, SGW 433, PGW 434, PCRF 435. Other LTE and 5GC VNFs are typically present but are omitted for clarity. NFVI hardware 601 executes NFVI hardware drivers 602, NFVI operating systems and hypervisors 603, NFVI virtual layer 604, and NFVI VNFs 605 to serve 5GNR/LTE UE 410 with data services over EN-DC node 420.

SGW 433 exchanges user data with EN-DC node 420 over backhaul links 405. MME 431 receives S1-MME signaling from EN-DC node 420 that request data services for UE 410. MME 431 interacts with HSS 432 to authenticate and authorize UE 410 for wireless data services that are represented by APNs—and that include 5GNR service for UE 410. MME 431 generates 5GNR instructions for UE 410 responsive to the 5GNR indication in the S1-MME signaling and the authorization. MME 431 transfers the APNs for UE 410 to PGW 434 over SGW 433. PGW 434 interacts with PCRF 435 to select QCIs and network addresses for UE 410 based on the APNs. PGW 434 transfers the APNs, QCIs, and addresses to MME 431 over SGW 433. MME 431 transfers the APNs, QCIs, network addresses, and 5GNR instructions for UE 410 to EN-DC node 420. PGW 434 exchanges user data for UE 410 with external systems over SGi links 406. PGW 434 exchanges the user data with SGW 434 which exchanges the user data with the LTE PDCP in EN-DC node 420 (not shown on FIG. 6). MME 431 receive signaling from EN-DC node 420 that indicates UE 410 is ready for the 5GNR data service. MME 431 directs SGW 433 to serve UE 410 over the 5GNR PDCP in EN-DC node 420. As PGW 434 continues to exchange user data for UE 410 with external systems over SGi links 406, SGW 433 exchanges some of this user data with the LTE PDCP in EN-DC node 420 and exchanges the rest of the user data with the 5GNR PDCP in EN-DC node 420.

Figure 7:
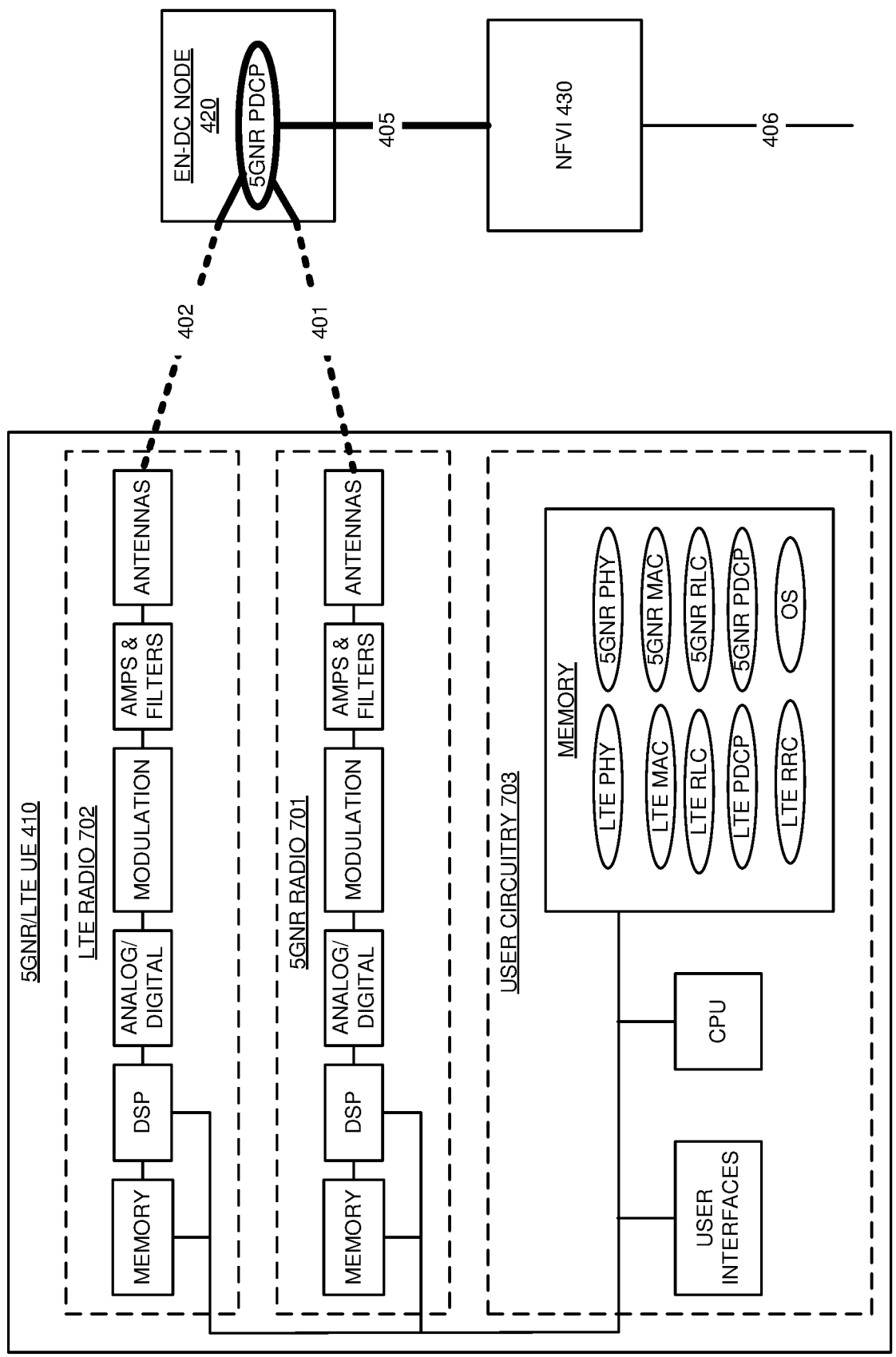
FIG. 7 illustrates a 5GNR/LTE UE to receive the synchronized data service over the 5GNR/LTE links and the EN-DC access node.

FIG. 7 illustrates 5GNR/LTE UE 400 that receives the synchronized data service over 5GNR/LTE links 401-402 and EN-DC access node 420. 5GNR/LTE UE 410 is an example of UEs 111-113, although UEs 111-113 may differ. UE 410 comprises 5GNR radio 701, LTE radio 702, and user circuitry 703 that are coupled over bus circuitry. Radios 701-702 comprise antennas, amplifiers, filters, modulation, analog-to-digital interfaces, DSP, and memory that are coupled over bus circuitry. User circuitry 703 comprises user interfaces, CPU, and memory that are coupled over bus circuitry. The antennas in radios 701-702 are wirelessly coupled to EN-DC node 420 over links 401-402. The user interfaces in user circuitry 703 comprise graphic displays, machine controllers, sensors, cameras, transceivers, and/or some other user components. The memory in user circuitry 703 stores an operating system, user applications (USER), and network applications for 5GNR and LTE (PHY, MAC, RLC, PDCP, and RRC). The CPU in user circuitry 703 executes the operating system and the user applications to generate and consume user data. The CPU in user circuitry 703 executes the operating system and the network applications to wirelessly exchange corresponding signaling and data with EN-DC node 420 over radios 701-702.

The LTE RRC in 5GNR/LTE UE 410 attaches to the LTE RRC in EN-DC node 420 over the LTE RLC, MAC, PHY, radio 702, and link 402. The LTE RRC in UE 410 indicates its 5GNR UE capability to the LTE RRC in EN-DC node 420. The LTE RRC receives APNs, QCIs, network addresses, and 5GNR instructions from the LTE RRC in EN-DC node 420. EN-DC node 420 wirelessly exchanges user data with the LTE PDCP in 5GNR/LTE UE 410 over the LTE RLC, MAC, PHY, radio 702, and link 402. In response to the 5GNR instructions, the LTE RRC directs the 5GNR PHY to measure and report the signal strength of 5GNR link 401 from EN-DC node 420 (and typically other 5GNR links). Since the APNs/QCIs for UE 410 warrant 5GNR transmission and the signal quality over 5GNR link 401 is adequate, the LTE RRC directs the 5GNR PDCP to attach to the 5GNR PDCP in EN-DC node 420 over 5GNR link 401. The 5GNR PDCP in UE 410 exchanges user data with the 5GNR PDCP in EN-DC node 420 over 5GNR radio 701, 5GNR link 401, and their 5GNR RLCs, MACs, and PHYs. In particular, the 5GNR PDCP in EN-DC node 420 splits the user data for delivery over 5GNR link 401 and over LTE link 402. The 5GNR PDCP in EN-DC node 420 delays some of the user data to synchronize delivery over 5GNR/LTE links 401-402.

Figure 8:
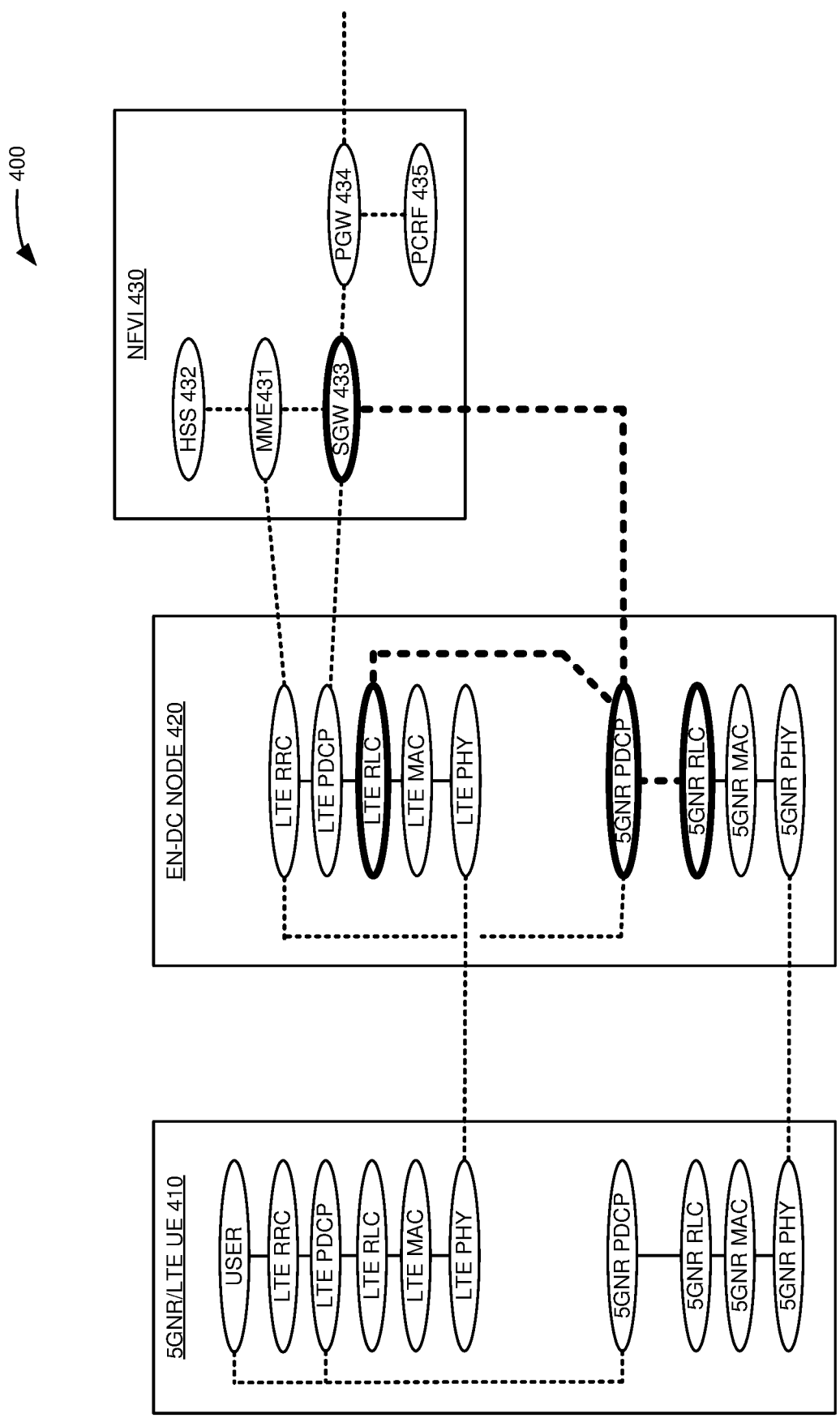
FIG. 8 illustrates the operation of the 5GNR LTE network to serve the 5GNR/LTE UEs with the synchronized data service over the 5GNR/LTE links and the EN-DC access node.

FIG. 8 illustrates the operation of 5GNR LTE network 400 to serve 5GNR/LTE UE 410 with the synchronized data service over EN-DC access node 420. The LTE RRC in 5GNR/LTE UE 410 attaches to the LTE RRC in EN-DC node 420 over their LTE PDCPs, RLCs, MACs, and PHYs. The LTE RRC in UE 410 indicates its 5GNR capability. The LTE RRC in EN-DC node 420 requests data service for UE 410 from MME 431 and indicates the 5GNR UE capability. MME 431 interacts with HSS 432 to authenticate and authorize LTE/5GNR UE 410 for wireless data services that are indicated by APNs. MME 431 generates 5GNR instructions for UE 410 in response to the 5GNR UE capability and the UE authorization. MME 431 transfers the APNs for UE 410 to PGW 434 over SGW 433. PGW 434 interacts with PCRF 435 to select QCIs and network addresses for LTE/5GNR UE 410 based on the APNs. PGW 434 transfers the APNs, QCIs, and network addresses for UE 410 to MME 431 over SGW 433. MME 431 transfers the APNs, QCIs, network address, and 5GNR instructions for UE 410 to the LTE RRC in EN-DC node 420. The LTE RRC in EN-DC node 420 transfers the selected APNs, QCIs, network addresses, and 5GNR instructions to the LTE RRC in UE 410 over their LTE PDCPs, RLCs, MACs, and PHYs. PGW 434 exchanges user data for UE 410 with external systems. PGW 434 exchanges the user data with SGW 433 which exchanges the user data with the LTE PDCP in EN-DC node 420. The LTE PDCP in EN-DC node 420 wirelessly exchanges the user data with the LTE PDCP in UE 410 over their LTE RLCs, MACs, and PHYs.

In response to the 5GNR instructions, the LTE RRC in UE 410 directs the 5GNR PHY in UE 410 to measure the 5GNR signal quality from EN-DC node 420. The LTE PHY reports the 5GNR signal quality to the LTE RRC in UE 410, and the LTE RRC in UE 410 reports the 5GNR signal quality to the LTE RRC in EN-DC node 420. The LTE RRC in EN-DC node 420 directs the LTE RRC in UE 410 to attach to EN-DC node 420 over 5GNR. The LTE RRC in UE directs the 5GNR PDCP in UE 410 to attach to EN-DC node 420. The 5GNR PDCP in UE 410 attaches to the 5GNR PDCP in EN-DC node 420 over their 5GNR RLCs, MACs, and PHYs. The 5GNR PDCP in EN-DC node 420 signals the 5GNR attachment to the LTE RRC in EN-DC node 420, and the LTE RRC signals the 5GNR attachment to MME 431. MME 431 directs SGW 433 to serve UE 410 over the 5GNR PDCP in EN-DC node 420.

PGW 434 continues to exchange user data for UE 410 with external systems. PGW 434 exchanges the user data with SGW 433 which exchanges the user data with the LTE PDCP and the 5GNR PDCP in EN-DC node 420. The LTE PDCP in EN-DC node 420 and the LTE PDCP in UE 410 exchange the user data over their LTE PDCPs, RLCs, MACs, and PHYs. The 5GNR PDCP in EN-DC node 420 and the 5GNR PDCP in UE 410 exchange the user data over their 5GNR PDCPs, RLCs, MACs, and PHYs.

In addition, the 5GNR PDCP in EN-DC node 420 splits its downlink user data into 5GNR data and LTE data. The 5GNR PDCP in EN-DC node 420 routes the 5GNR data to the 5GNR PDCP in UE 410 over their 5GNR RLCs, MACs, and PHYs. The 5GNR PDCP in EN-DC node 420 routes the LTE data to the LTE RLC in EN-DC 420, and the LTE RLC transfers the LTE data to the LTE PDCP in UE 410 over the LTE RLC, MACs, and PHYs.

In EN-DC node 420, the 5GNR PDCP multiplies the downlink 5GNR throughput by the downlink 5GNR RLC buffer fill to get a 5GNR delivery time. The 5GNR PDCP multiplies the downlink LTE throughput by the downlink LTE RLC buffer fill to get an LTE delivery time. The 5GNR PDCP determines the difference between the LTE delivery time and the 5GNR delivery time. When the 5GNR delivery time is shorter (typical), the 5GNR PDCP delays the downlink 5GNR data by the time difference. When the LTE delivery time is shorter (atypical), the 5GNR PDCP delays the downlink LTE data by the time difference.

PGW 434 continues to exchange user data for UE 410 with external systems. PGW 434 exchanges the user data with SGW 433 which exchanges the user data with the LTE PDCP and the 5GNR PDCP in EN-DC node 420. The LTE PDCP in EN-DC node 420 and the LTE PDCP in UE 410 exchange the user data over their LTE PDCPs, RLCs, MACs, and PHYs. The 5GNR PDCP in EN-DC node 420 and the 5GNR PDCP in UE 410 exchange the user data over their 5GNR PDCPs, RLCs, MACs, and PHYs.

In addition, the 5GNR PDCP in EN-DC node 420 splits downlink user data into 5GNR data and LTE data. The 5GNR PDCP delays the 5GNR data and/or the LTE data by the time difference to synchronize data delivery to UE 410. The 5GNR PDCP in EN-DC node 420 routes the 5GNR data to the 5GNR PDCP in UE 410 over their 5GNR RLCs, MACs, and PHYs. The 5GNR PDCP in EN-DC node 420 routes the LTE data to the LTE RLC in EN-DC 420, and the LTE RLC transfers the LTE data to the LTE PDCP in UE 410 over the LTE RLC, MACs, and PHYs. UE 410 receives the 5GNR data and the LTE data in a synchronized manner due to the equalized delivery times.

The wireless data network circuitry described above comprises computer hardware and software that form special-purpose network circuitry to serve wireless UEs with a synchronized data service over multiple wireless links. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless UEs with a synchronized data service over multiple wireless links.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a wireless User Equipment (UE) with a synchronized data service over multiple wireless links, the method comprising:
   a wireless access node executing a Protocol Data Convergence Protocol (PDCP), receiving user data from the wireless communication network, and transferring the user data to the PDCP;
   in wireless access node, the PDCP separating the user data into direct data and indirect data, routing the direct data toward the wireless UE, and routing the indirect data toward a wireless support node for delivery to the wireless UE;
   the wireless access node wirelessly transferring the direct data to the wireless UE and transferring the indirect data for delivery to the wireless support node;
   the wireless support node receiving the indirect data transferred by the wireless access node and wirelessly transferring the indirect data to the wireless UE;
   in wireless access node, the PDCP estimating a transmission time difference between the direct data and the indirect data based on wireless access node buffer status, wireless access node data throughput, wireless support node buffer status, and wireless support node data throughput;
   the wireless access node receiving additional data from the wireless communication network and transferring the additional data to the PDCP;
   in wireless access node, the PDCP separating the additional data into additional direct data and additional indirect data, delaying at least one of the additional direct data and the additional indirect data to synchronize delivery of the additional data to the wireless UE, routing the additional direct data toward the wireless UE, and routing the additional indirect data toward the wireless support node for delivery to the wireless UE;
   the wireless access node wirelessly transferring the additional direct data to the wireless UE and transferring the additional indirect data for delivery to the wireless support node; and
   the wireless support node receiving the additional indirect data transferred by the wireless access node and wirelessly transferring the additional indirect data to the wireless UE.

2. The method of claim 1 wherein the PDCP comprises a Fifth Generation New Radio (5GNR) PDCP.

3. The method of claim 1 wherein the wireless access node comprises a Fifth Generation New Radio (5GNR) access node.

4. The method of claim 1 wherein the wireless UE comprises a Fifth Generation New Radio (5GNR) UE.

5. The method of claim 1 wherein the wireless support node comprises a Long Term Evolution (LTE) access node.

6. The method of claim 1 wherein the wireless access node and the wireless support node comprise an Evolved Universal Terrestrial Radio Access Network Dual Connectivity (EN-DC) access node.

7. The method of claim 1 wherein:
the PDCP comprises a Fifth Generation New Radio (5GNR) PDCP;
the wireless communication network comprises a Central Unit (CU) and Distributed Unit (DU);
the CU comprises a portion of the wireless access node including the 5GNR PDCP;
the CU comprises a portion of the wireless support node including an LTE Radio Resource Control (RRC), LTE PDCP, LTE Radio Link Control (RLC), LTE Media Access Control (MAC), and LTE Physical Layer (PHY); and
the DU comprises another portion of the wireless access node that comprises a 5GNR RLC, 5GNR MAC, and 5GNR PHY.

8. A wireless communication network to serve a wireless User Equipment (UE) with a synchronized data service over multiple wireless links, the wireless communication network comprising:
a wireless access node configured to execute a Protocol Data Convergence Protocol (PDCP), receive user data from the wireless communication network, and transfer the user data to the PDCP;
in wireless access node, the PDCP configured to separate the user data into direct data and indirect data, route the direct data toward the wireless UE, and route the indirect data toward a wireless support node for delivery to the wireless UE;
the wireless access node configured to wirelessly transfer the direct data to the wireless UE and transfer the indirect data for delivery to the wireless support node;
the wireless support node configured to receive the indirect data transferred by the wireless access node and wirelessly transfer the indirect data to the wireless UE;
in wireless access node, the PDCP configured to estimate a transmission time difference between the direct data and the indirect data based on wireless access node buffer status, wireless access node data throughput, wireless support node buffer status, and wireless support node data throughput;
the wireless access node configured to receive additional data from the wireless communication network and transfer the additional data to the PDCP;
in wireless access node, the PDCP configured to separate the additional data into additional direct data and additional indirect data, delay at least one of the additional direct data and the additional indirect data to synchronize delivery of the additional data to the wireless UE, route the additional direct data toward the wireless UE, and route the additional indirect data toward the wireless support node for delivery to the wireless UE;
the wireless access node configured to wirelessly transfer the additional direct data to the wireless UE and transfer the additional indirect data for delivery to the wireless support node; and
the wireless support node configured to receive the additional indirect data transferred by the wireless access node and wirelessly transfer the additional indirect data to the wireless UE.

9. The wireless communication network of claim 8 wherein the PDCP comprises a Fifth Generation New Radio (5GNR) PDCP.

10. The wireless communication network of claim 8 wherein the wireless access node comprises a Fifth Generation New Radio (5GNR) access node.

11. The wireless communication network of claim 8 wherein the wireless UE comprises a Fifth Generation New Radio (5GNR) UE.

12. The wireless communication network of claim 8 wherein the wireless support node comprises a Long Term Evolution (LTE) access node.

13. The wireless communication network of claim 8 wherein the wireless access node and the wireless support node comprise an Evolved Universal Terrestrial Radio Access Network Dual Connectivity (EN-DC) access node.

14. The wireless communication network of claim 8 wherein:
the PDCP comprises a Fifth Generation New Radio (5GNR) PDCP;
the wireless communication network comprises a Central Unit (CU) and Distributed Unit (DU);
the CU comprises a portion of the wireless access node including the 5GNR PDCP;
the CU comprises a portion of the wireless support node including an LTE Radio Resource Control (RRC), LTE PDCP, LTE Radio Link Control (RLC), LTE Media Access Control (MAC), and LTE Physical Layer (PHY); and
the DU comprises another portion of the wireless access node that comprises a 5GNR RLC, 5GNR MAC, and 5GNR PHY.

* * * * *